Dec. 23, 1969  G. M. RAPATA  3,485,133
DRIVE FASTENER
Filed May 13, 1968  2 Sheets-Sheet 1
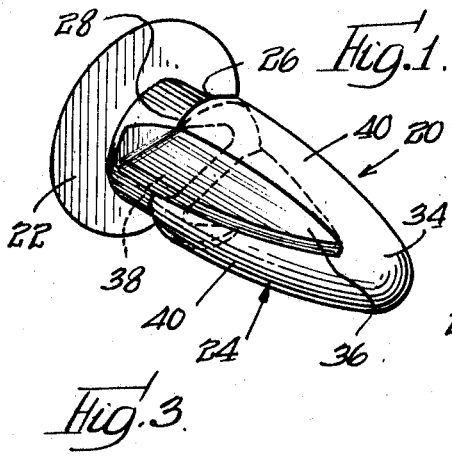
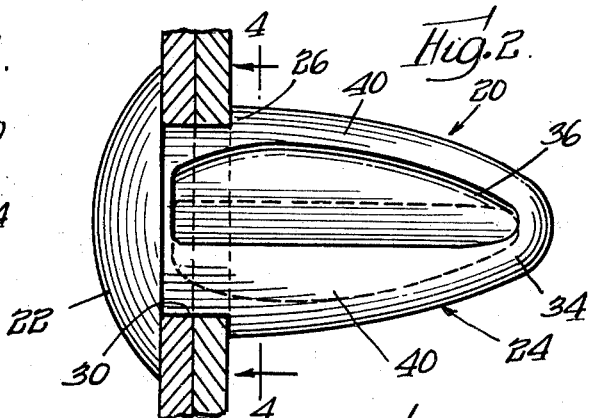
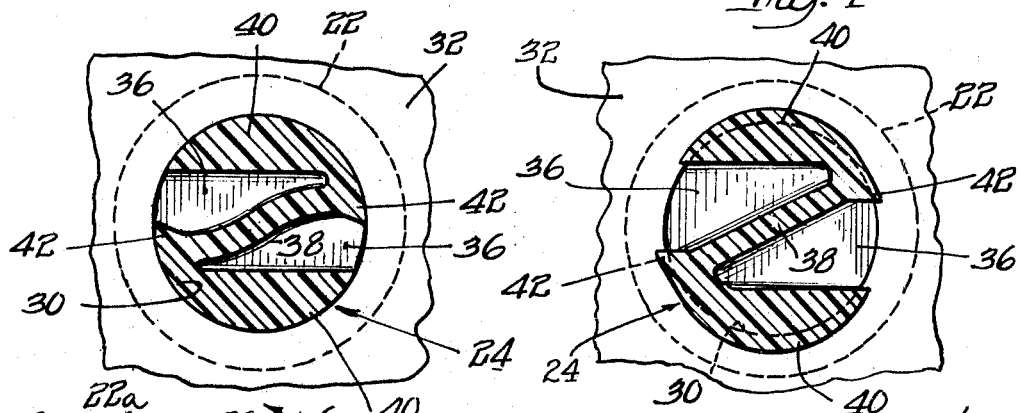
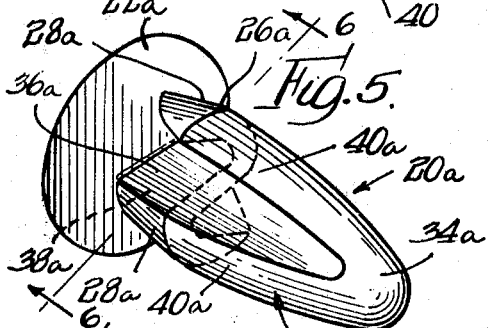
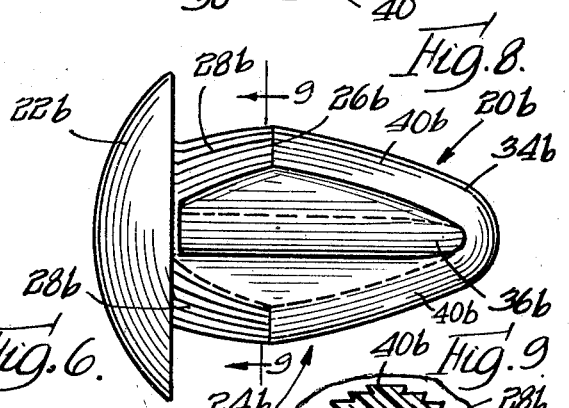
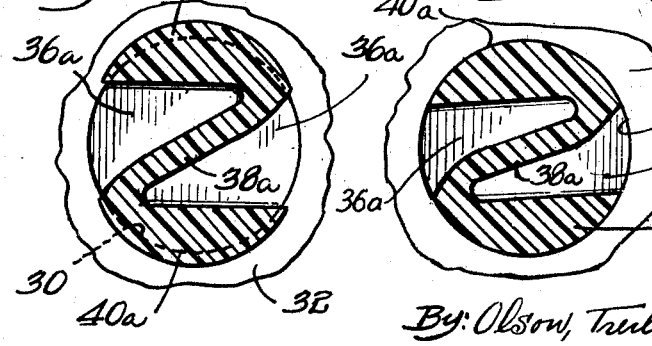
Inventor
George M. Rapata
By: Olson, Trexler, Wolters & Bushnell attys

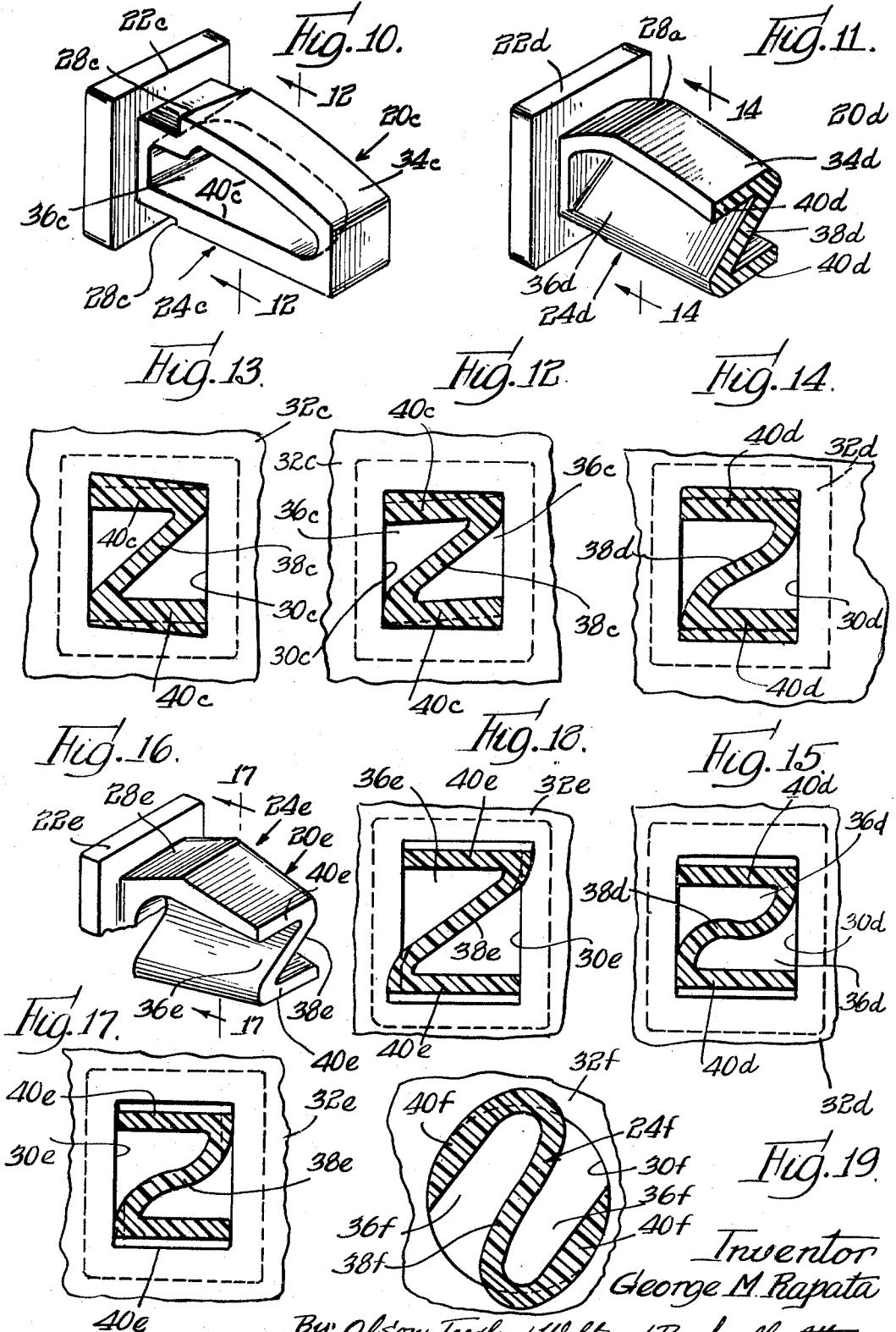

United States Patent Office 3,485,133
Patented Dec. 23, 1969

3,485,133
DRIVE FASTENER
George Martin Rapata, Park Ridge, Ill., assignor to Illinois Tool Works Inc., Chicago, Ill., a corporation of Delaware
Filed May 13, 1968, Ser. No. 728,712
Int. Cl. F16b 19/00
U.S. Cl. 85—5                8 Claims

ABSTRACT OF THE DISCLOSURE

The present invention relates generally to drive fasteners and more particularly to one-piece drive fasteners having an elongated shank insertable within a complementary workpiece aperture. The present application discloses a number of embodiments of the invention. These embodiments include, in addition to the elongated shank section referred to above, a head section from which the shank extends. This head section provides a surface for clampingly engaging one side of an apertured workpiece and the shank section is enlarged intermediate the extremities thereof to provide shoulder means for engaging the opposite side of the workpiece in the vicinity of the work aperture. The shank is radially yieldable in the vicinity of the shoulder means and this yieldability is enhanced by reason of the novel cross-sectional shape of the shank in the vicinity of the shank enlargement. This is accomplished by providing a plurality of longitudinal recesses opening on opposite side of the shank periphery thereby presenting a generally sinuously shaped cross-section.

DISCLOSURE

The present invention contemplates the provision of a one-piece drive fastener having a radially yieldable shank member of novel form which is so designed as to provide increased transverse flexibility and at the same time assure positive retention within an apertured workpiece.

It is a further object of the present invention to provide a fastener of the type referred to above which will function with the same high degree of efficiency in work apertures of various sizes and shapes. To this end the invention contemplates a fastener in which the shank thereof is provided with a novel arrangement of longitudinally extending peripheral recesses.

The present invention also contemplates the provision of a new and practical drive fastener in which the novel shank contour or shape assures symmetry in form and, as a result, a balanced distribution of forces functioning to maintain the fastener shank in expanded position and thereby assure positive retention of the fastener within the work aperture.

More specifically, the invention contemplates the provision of a unique fastener stud construction wherein a transverse, longitudinally extending web section is employed to secure the stud or shank against unauthorized withdrawal from an apertured workpiece.

Still more specifically it is an object of the present invention to accomplish the above-mnetioned structural and functional advantages by employing a new and improved fastener shank of generally sinuous cross-section.

The foregoing and other objects and advantages will be more apparent from the following detailed description when considered in connection with the accompanying drawings, wherein:

FIG. 1 is a perspective view of a one-piece drive fastener constructed in accordance with the teachings of the present invention;

FIG. 2 discloses the fastener of FIG. 1 with the novel shank thereof inserted within a complementary aperture of a workpiece;

FIG. 3 is a transverse sectional view of the fastener shank of sinusoidal or Z-shape cross-section before final or complete insertion thereof within an apertured workpiece;

FIG. 4 is a view similar to FIG. 3 taken along the line 4—4 of FIG. 2, disclosing the fastener shank after complete insertion thereof within the work aperture;

FIG. 5 is a perspective view similar to FIG. 1, disclosing a fastener shank structure of modified form;

FIG. 6 is a transverse sectional view of the fastener shank disclosed in FIG. 5, showing the collapsed position of the fastener shank sections during initial insertion thereof within a work aperture;

FIG. 7 is a sectional view similar to FIG. 6, disclosing the fastener of FIG. 5 after the shank thereof has been finally inserted within the work aperture, in which position the shank sections have expanded into interlocked relation with the margin defining the work aperture;

FIG. 8 is a side elevational view of a one-piece fastener which is representative of another embodiment of the present invention;

FIG. 9 is a transverse sectional view of the fastener of FIG. 8, said view being taken substantially along the line 9—9 of FIG. 8;

FIG. 10 is a perspective view of a still further modified fastener structure contemplated by the present invention, said fastener having a shank of sinusoidal or Z-shape in cross-section, particularly adapted for use in work apertures of polygonal shape;

FIG. 11 is a perspective view similar to FIG. 10 disclosing a fastener for use in apertures of polygonal shape, the entering extremity of the fastener shank being open as distinguished from the closed extremity of the fastener shank shown in FIG. 10;

FIG. 12 is a view taken substantially along the line 12—12 of FIG. 10 disclosing the collapsed position of the fastener shank sections during partial insertion within the work aperture;

FIG. 13 is a sectional view similar to FIG. 12, disclosing the expanded position of the fastener shank sections after it has been completely inserted within the work aperture.

FIG. 14 is a view taken substantially along the line 14—14 of FIG. 11, disclosing the fastener shank of FIG. 11 completely inserted within the complementary aperture of a workpiece;

FIG. 15 is a view similar to FIG. 14, disclosing the manner in which the diagonal or strut portion of the shank member is subjected to stress and consequent distortion as the shank is telescopically associated with the work aperture;

FIG. 16 is a fragmentary perspective view of a still further modified fastener arrangement, the shank of which is of trapezoidal cross-sectional shape and is subjected to compression in both a lateral and diagonal direction during the insertion thereof within a complementary work aperture to thereby enhance the retention capability of the fastener shank;

FIG. 17 is a transverse sectional view taken substantially along the line 17—17 of FIG. 16 during the partial insertion of the shank thereof within the work aperture, to disclose the manner in which the diagonal or web portion of the shank is stressed into S-shape, thereby exerting both diagonal and lateral forces which tend to expand the peripheral shank sections;

FIG. 18 is a sectional view similar to FIG. 17, disclosing the fastener shank after it has been finally inserted and the diagonal or web portion thereof has caused the diagonally opposed corners of the shank to overlie the margin defining the work aperture and the oppositely disposed ledges or sections of the fastener shank have been forced into firm interlocked engagement with the companion or complementary adjacent marginal edges defining said aperture; and FIG. 19 is a cross-sectional view of a fastener shank of modified sinusoidal form which closely resembles an S in shape, the oppositely disposed arcuate portions thereof disclosed in overlying or interlocking engagement with the adjacent circumferential marginal areas defining the work aperture.

Referring now to the drawings more in detail, wherein like numerals have been employed to designate various parts throughout the various figures, it will be seen that one embodiment of a fastener constructed in accordance with the teachings of the present invention is designated generally by the numeral 20, FIGS. 1 and 2. The fastener 20 includes a head portion 22 and a shank portion 24 extending therefrom. The fastener 20 is of one-piece construction and may be readily formed from suitable plastic material. Intermediate the extremities of the fastener shank 24 is an enlarged section providing a pair of oppositely disposed shoulder means 28 adapted to overlie the circumferential margins defining an aperture 30 in a workpiece 32. The periphery of the fastener shank 24 tapers toward its entering extremity 34 to facilitate initial insertion of the fastener shank within the work aperture 30.

Particular attention is directed to the sinusoidal cross-sectional shape of the fastener shank 24 as clearly illustrated in the sectional views of FIGS. 3 and 4. It will be noted that the fastener shank 24 is provided with longitudinal recesses 36, each of which extend transversely of the shank and are separated by a transverse or diagonal web section. Each extremity of the web 38 supports peripheral shank sections 40, the outer surfaces of which define the shank periphery. In cross-section, as shown in FIGS. 3 and 4, the web 38 and circumferential sections 40 in the vicinity of the maximum diameter or enlarged portion of the shank define a generally S or Z shape. As the shank 24 is initially inserted within the work aperture 30, it is collapsed or buckled so as to accommodate itself to the circular contour of said aperture. This is clearly shown in FIG. 3. During this period of collapsing, the web 38 is subjected to stresses tending to resist the collapsing movement of the peripheral shank sections 40. When the shank has been fully inserted within the aperture 30 as shown in FIGS. 2 and 4, the energy stored up in the web 38 will be released so as to cause the peripheral sections 40 to spring radially outwardly to the interlocked position shown in FIG. 4. Relatively sharp or abrupt peripheral portions 42 of the shank 24, located at each extremity of the strut or diagonal element 38, serve to increase the aggressiveness with which the shank interlocks with the workpiece to prevent unauthorized dislodgement of the fastener.

In FIGS. 5, 6 and 7, a drive fastener device of modified form is shown and is designated generally by the numeral 20a. The various sections comprising the fastener 20a having similar functional and structural characteristics to those disclosed in FIGS. 1–4, inclusive, are identified by corresponding numerals bearing the suffix a. Particular attention is directed to the fact that the fastener of FIGS. 1–4 inclusive incorporates abrupt shoulder means 28 which are adapted to engage the side of the workpiece 32 oppositely disposed from the fastener head portion 22. The fastener shown in FIGS. 5–7 inclusive does not incorporate the abrupt shoulder 28, but relies upon the tapered peripheral surface or shoulder means 28a positioned between the enlargement 26a and the head portion 22a. Also the fastener shown in FIGS. 5–7 inclusive does not incorporate the relatively sharp peripheral shank margins designated by the numeral 42 in FIGS. 3 and 4. The shank 24a like the shank 24 is sinusoidal or substantially Z-shaped in cross-section, and incorporates a web or strut 38a which functions similarly to the previously described web 38 to insure a firm interlock between the tapered surface areas 28a and the complementary margins of the workpiece defining the work aperture 30.

FIGS. 8 and 9 disclose a still further modified fastener device designated generally by the numeral 20b. The only significant structural difference between the fastener 20b and the fastener 20a is in the provision of a splined or roughened surface area or shoulder means 28b which functions similarly but more aggressively than the previously described surface 28a in securing the fastener within a workpiece. All other elements of the fastener 20b are identified by numerals bearing the suffix b corresponding with like numerals disclosed in the previously described figures.

FIGS. 10, 12 and 13 disclose a one-piece drive fastener designated generally by the numeral 20c. The fastener 20c is particularly adapted for use with work apertures of polygonal shape. The shank 24c of the fastener 20c is sinusoidal or Z-shaped in cross-section as clearly shown in FIGS. 10, 12 and 13. The portion of the shank 24c adjacent the head portion 22c is rectangular in cross-section and hence is adapted to be received by complementary rectangular work apertures 30c in a workpiece 32c. The shank 24c has a closed entering extremity 34c of reduced cross-section to facilitate initial insertion of the shank within the work aperture. Shoulder means 28c disposed on opposite sides of the shank 24c adjacent the head portion 22c function similarly to the shoulder means 28, 28a and 28b previously described. Other elements of the fastener 20c corresponding with like elements of the previously described fasteners have been designated by similar numerals bearing the suffix c. The surfaces 28c are in the nature of tapered margins extending from one side of the fastener shank to the other, as clearly illustrated in FIGS. 12 and 13. As the shank 24c is initially inserted within the work aperture, the sections 40c of the shank are collapsed, thus subjecting the diagonal or strut section 38c of the fastener to stresses as previously described.

FIGS. 11, 14 and 15 disclose a fastener designated generally by the numeral 20d which is similar in certain respects to the fastener 20c just described. The shank 24d of the fastener 20d is designed for use in work apertures of polygonal shape. The entering extremity 34d is open ended as distinguished from the closed end of the fastener 20c and the shank 24d is secured within a rectangular work aperture 30d by the engagement of tapered surfaces 28d with the adjacent or complementary marginal sections of the workpiece defining opposed sides of the aperture. It will be noted that when the shank sections 40d are collapsed as shown in FIG. 15, the diagonal or strut member 38d becomes somewhat distorted due to the stress to which it is subjected. This energy thus stored in the distorted web 38d causes the shank to expand to the position shown in FIG. 14, when the shank or stud 24d has been completely inserted.

FIGS. 16–18 inclusive show a still further modified form of fastener which is designated generally by the numeral 20e. The fastener 20e is quite similar to the fastener shown in FIGS. 11 and 14, but differs therefrom in that its cross-section defines a trapezoid as clearly shown in FIG. 18. It will be noted that when the shank 24e is in its normal expanded position, portions of the shank located at opposite extremities of the diagonal member or strut 38e overlie complementary corners of the margin of the workpiece adjacent the polygonal aperture 30e. It will be understood therefore that the shank 24e if finally secured in position within the work aperture 30e by reason of the engagement of the shoulder means or surfaces 28e with the side margin of the workpiece defining the aperture coupled with the engagement of the opposite corners of the diagonal 38e with the work surface as clearly illustrated in FIG. 18. The shank 24e, like the previously described shank 24d, causes the diagonal or strut member 30e to be distorted when initially subjected to collapsing forces, as shown in FIG. 17. The energy developed in the strut member is released when the fastener shank is fully inserted, thereby causing the expansion of the shank section into firm interlocking engagement with the margins defining the work aperture.

In FIG. 19 a still further modified fastener shank 24f is shown. The sinusoidal cross-section of the shank 24f more closely resembles an S-shape as distinguished from the previously disclosed Z-shaped shanks. When the shank 24f is fully expanded as shown in FIG. 19, diagonally opposed peripheral or circumferential sections of the shank interlock with the margin defining the work aperture 30f to secure the shank into position within the workpiece.

From the foregoing it will be apparent that the present invention contemplates a one-piece drive fastener of improved practical construction. The sinusoidal cross-sectional shape of the shank makes it possible to bring into play expansion forces established within the web or strut member. In certain forms the strut member may serve merely as a support for one margin of the peripheral shank sections, permitting the peripheral shank sections to flex about the fulcrum located at the extremity of the strut. In other forms the strut or diagonal member may be so disposed as to be subjected to stresses and possible distortion during the collapsing of the peripheral shank sections. In this manner, energy stored within the strut section is released upon the complete insertion of the fastener shank, thereby effecting a very positive retention force against the margin of the workpiece which defines the aperture into which the shank is inserted. Also, the fastener constructed in accordance with the teachings of the present invention may be so designed as to accommodate work apertures of different size or shape. As previously described, the fastener shank of one form may be used particularly in circular work apertures, whereas other forms are particularly designed for use with work apertures of polygonal shape. In the disclosed embodiments of the fastener the head portion cooperates with the shoulder means on the shank to secure workpieces together. It should be understood, however, that the head portion may be used for other purposes, for example as shelf supports and the like. In such instances, the shank may be inserted within the aperture of a panel, and the head portion may be shaped to serve as a support. The sinusoidal or Z-shaped cross-section of the fastener shank makes it possible to distribute forces tending to hold the shank in place uniformly along the shank periphery. Also the collapsing of the peripheral shank sections may be controlled so as to enhance uniformity in distribution of the stresses developed during the collapsing of the fastener shank.

While for purposes of illustration various embodiments of the invention have been disclosed herein, it should be understood that the invention contemplates other modifications and changes.

The invention is claimed as follows:

1. A one-piece plastic drive fastener including an elongated shank section insertable within a complementary workpiece aperture, a head section from which said shank section extends, said head section having a clamping surface for engaging one side of an apertured workpiece when said shank section has been fully inserted therein, said shank section having an enlargement intermediate the extremities thereof providing shoulder means for engaging the side of the workpiece oppositely disposed from the side which is engaged by said head section, said shank section in the vicinity of said enlargement being generally Z-shaped in transverse cross-section, presenting a pair of generally parallel, laterally spaced, longitudinal shank elements, depending from said head section and defining outer peripheral, diametrically disposed, work-engaging surfaces, and a longitudinal web member diagonally connecting a pair of longitudinal margins of said shank elements and providing a yieldable transverse strut, the diameter of the shank enlargement adjacent the junction of the diagonal web member with said shank elements being normally greater than the maximum diameter of the work aperture for accommodating said shank section, whereby to assure subjection of said diagonal web to stress upon insertion of the shank section within said work aperture, and the free extremity of said shank section being of reduced cross-sectional dimension to facilitate insertion thereof within a work aperture.

2. A one-piece drive fastener as set forth in claim 1 wherein the shank of generally Z-shaped cross-section includes a pair of longitudinal shank recesses separated by the longitudinal web, the thickness of said web being no greater than the thickness of said peripheral shank elements.

3. A one-piece drive fastener as set forth in claim 1 wherein said shank elements are radially collapsible upon insertion of the shank section within a work aperture, substantially the entire circumferential extent of said diametrically disposed peripheral surfaces normally define a diameter greater than the work aperture for accommodating said shank section.

4. A one-piece drive fastener as set forth in claim 1 wherein the shank section in the vicinity of the head section is substantially polygonal in cross-section.

5. A one-piece drive fastener as set forth in claim 1 wherein the shank elements are collapsible and wherein said elements and diagonal web member are structurally dimensioned so that forces tending to collapse said shank elements are transmitted to said web member.

6. A one-piece drive fastener as set forth in claim 1 wherein the periphery of the shank section substantially throughout the length thereof defines a polygon in transverse cross-section.

7. A one-piece drive fastener as set forth in claim 1 wherein the shoulder means is tapered and provided with roughened surfaces to enhance the aggressiveness of contact thereof with the margin of the workpiece which defines the shank accommodating work aperture.

8. A one-piece drive fastener as set forth in claim 1 wherein the shoulder means is tapered and provided with a plurality of longitudinally extending serrations to enhance the aggressiveness of contact thereof with the margin of the workpiece which defines the shank accommodating work aperture.

References Cited

UNITED STATES PATENTS

| | | | |
|---|---|---|---|
| 2,554,704 | 5/1951 | Hoppe | 85—8.3 |
| 3,169,439 | 2/1965 | Rapata | 85—5 |
| 3,177,540 | 4/1965 | Hall et al. | 85—80 |
| 3,181,411 | 5/1965 | Mejlso | 85—5 |

FOREIGN PATENTS

| | | |
|---|---|---|
| 642,940 | 5/1964 | Belgium. |
| 1,342,218 | 9/1963 | France. |
| 490,718 | 8/1938 | Great Britain. |

EDWARD C. ALLEN, Primary Examiner